US007540939B2

(12) United States Patent
Graff et al.

(10) Patent No.: US 7,540,939 B2
(45) Date of Patent: Jun. 2, 2009

(54) ABSORBENT EMBOSSED PAPER SHEET

(75) Inventors: Pierre Graff, Wolfgantzen (FR); Pierre Laurent, Turkheim (FR)

(73) Assignee: Georgia-Pacific France, Kunheim (FR)

( * ) Notice: Subject to any disclaimer, the term of this patent is extended or adjusted under 35 U.S.C. 154(b) by 508 days.

(21) Appl. No.: 10/502,316

(22) PCT Filed: Jan. 24, 2003

(86) PCT No.: PCT/FR03/00229

§ 371 (c)(1),
(2), (4) Date: Aug. 17, 2004

(87) PCT Pub. No.: WO03/062530

PCT Pub. Date: Jul. 31, 2003

(65) Prior Publication Data

US 2005/0067089 A1 Mar. 31, 2005

(30) Foreign Application Priority Data

Jan. 25, 2002 (EP) ................................ 02290181

(51) Int. Cl.

| | |
|---|---|
| ***B31F 1/07*** | (2006.01) |
| ***D21H 27/40*** | (2006.01) |
| ***B32B 3/00*** | (2006.01) |

(52) U.S. Cl. ....................... 162/117; 162/109; 162/123; 428/156; 428/172

(58) Field of Classification Search ......... 162/123-133, 162/117, 111-113, 109; 428/156, 172, 537.5, 428/153-154, 174

See application file for complete search history.

(56) References Cited

U.S. PATENT DOCUMENTS

| | | | | |
|---|---|---|---|---|
| 2,043,351 | A * | 6/1936 | Fourness et al. | 428/153 |
| 2,177,490 | A * | 10/1939 | Kieffer | 428/185 |
| 3,708,366 | A | 1/1973 | Donnelly | |
| 3,867,225 | A | 2/1975 | Nystrand | |
| 4,181,068 | A | 1/1980 | Pollock | |
| 4,927,588 | A * | 5/1990 | Schulz | 264/258 |
| 4,978,565 | A * | 12/1990 | Pigneul et al. | 428/156 |
| 5,093,068 | A * | 3/1992 | Schulz | 162/117 |
| 5,562,805 | A * | 10/1996 | Kamps et al. | 162/117 |
| 5,702,571 | A * | 12/1997 | Kamps et al. | 162/117 |
| 5,840,404 | A * | 11/1998 | Graff | 428/154 |
| 6,106,928 | A | 8/2000 | Laurent et al. | |

(Continued)

FOREIGN PATENT DOCUMENTS

EP 935012 A1 * 8/1999

(Continued)

*Primary Examiner*—José A Fortuna
(74) *Attorney, Agent, or Firm*—Breiner & Breiner, LLC

(57) ABSTRACT

The sheet of tissue paper includes at least one first embossed zone ($A_1$, $A_2$) having protrusions on a surface corresponding to alveoles on the other. The alveoles have a substantially polygonal base and the sheet includes at least one second, unembossed zone (B). In the invention, the alveoles 101', 102' are configured along at least one array, the mutually facing sides of two adjacent alveoles define a bridge (P) having rectilinear or substantially rectilinear edges of length L which is larger than its greatest width D, one or several bridges connected to each other subtending a path preferably between two second unembossed zones (B) which are separated by at least one first, embossed zone ($A_1$, $A_2$). The invention also relates to a cylinder embossing such a sheet.

10 Claims, 6 Drawing Sheets

U.S. PATENT DOCUMENTS

| | | | | |
|---|---|---|---|---|
| 6,173,496 | B1 | 1/2001 | Makoui et al. | |
| 6,235,373 | B1 | 5/2001 | Graff | |
| 6,253,373 | B1 * | 6/2001 | Peri | 717/150 |
| 6,365,000 | B1 * | 4/2002 | Dwiggins et al. | 162/111 |
| 6,423,397 | B1 * | 7/2002 | Roussel | 428/156 |
| 6,461,720 | B1 | 10/2002 | Graff | |
| 6,524,683 | B1 | 2/2003 | Roussel et al. | |
| 6,551,691 | B1 * | 4/2003 | Hoeft et al. | 428/172 |
| 6,589,634 | B2 * | 7/2003 | Schultz et al. | 428/195.1 |
| 2001/0008179 | A1 * | 7/2001 | Oriarian et al. | 162/109 |
| 2002/0155257 | A1 * | 10/2002 | Schultz et al. | 428/195 |
| 2003/0026953 | A1 * | 2/2003 | Muller | 428/174 |
| 2005/0034828 | A1 * | 2/2005 | Graff et al. | 162/123 |
| 2005/0067089 | A1 * | 3/2005 | Graff et al. | 162/117 |
| 2005/0103456 | A1 * | 5/2005 | Hein et al. | 156/209 |
| 2006/0201643 | A1 * | 9/2006 | Underhill et al. | 162/117 |
| 2006/0204726 | A1 * | 9/2006 | Underhill et al. | 428/174 |
| 2008/0020180 | A1 * | 1/2008 | Graff | 428/152 |

FOREIGN PATENT DOCUMENTS

| | | | | |
|---|---|---|---|---|
| EP | 1101867 | A1 | * | 5/2001 |
| EP | 1270196 | A1 | * | 1/2003 |
| EP | 1319748 | A1 | * | 6/2003 |
| EP | 1331308 | A1 | * | 7/2003 |
| FR | 2773564 | A1 | * | 7/1999 |
| WO | 0242558 | A2 | * | 5/2002 |
| WO | 02068758 | A1 | * | 9/2002 |
| WO | WO 03050353 | A2 | * | 6/2003 |

* cited by examiner

ABSORBENT EMBOSSED PAPER SHEET

FIELD OF INVENTION

The present invention relates to sanitary or household absorbent papers. In particular it relates to disposable products such as paper napkins, sheets, paper towels or toilet paper that are made of cellulose webs, hereafter tissue paper.

BACKGROUND OF THE INVENTION

Tissue paper is an absorbent paper which exhibits a specific surface weight preferably between 15 and 35 g/m$^2$ and which can be manufactured to be stretchable. A present-day technique applies and glues a still moist sheet while on a drying drum and then detaches it off this drum using a scraper blade in order to produce creping corrugations. The sheet then can be wound on a reel to await transformation into the finished product. This summarized technique is called conventional. It is denoted as CWP in the field.

Another technique consists in drying the sheet after it was drained but without applying pressure to it, at least in part until the dryness suffices to fix in place the fibers inside the sheet. Where appropriate, drying is finalized by placing the sheet on a heated cylinder. Thanks to this first drying stage, the sheet may be pressed against the cylinder without degrading the sheet's structure. The sheet retains part of its volume. This cylinder furthermore allows creping. The first drying action is carried out in the absence of excess pressure by blowing hot air through the sheet after it was drained. This technique is denoted as TAD in the field and allows producing thicker sheets of higher density than the conventional technique. It is characterized by a more open structure and greater permeability.

Thereupon and by means of the embossing technique, the sheet's properties may be improved or be at least modified, for instance softness, flexibility, absorption, thickness or appearance. Final finishing then depends on the final use. The embossing pattern typically is in the form of protrusions or bosses of pyramids of circular, oval or square cross-sections which are regularly spread over the surface of the sheet. Be it noted that a protrusion on one side of the sheet subtends a cavity or alveole on the other.

In order to emboss tissue paper, a rigid cylinder is generally used at the surface of which rise embossing tips produced by engraving or machining and which assume appropriate shapes, sizes and densities. The sheet is placed against the cylinder and then compressed by another cylinder fitted with a deformable cladding, for instance rubber. In this manner, the clad cylinder hugs the protrusions of the other cylinder. For a given pattern, the ensuing deformation depends on the selected parameters such as the cladding rubber's resiliency, its deformability and its ability to hug the engraving topography, and the embossing pressure.

At present applicant markets a paper towel of which the protrusions are arrayed in concentric circles. This paper towel consists of two plies of tissue paper that were embossed separately and which were assembled so that the protrusions are in so-called mutually "nested" positions. The protrusions of one ply are opposite the protrusions of the other ply and configured between each other. In this manner the two plies nest in each other and subtend air pockets and thus improve absorption. The sheet includes alveoles at its two visible sides. The appearance of such a sheet, not under the microscope but to the naked eye, exhibits a two-tier topography. A first tier is defined by the bottom of the alveoles (this bottom being in a single plane provided that the embossing tips are all at the same level). The second tier corresponds to the unembossed sheet portion.

In order to improve a paper towel's absorptivity, it can be processed at the time of its manufacture, that is on the papermaking machine, with respect, for example, to its constitution, its drying mode or any additives.

In this respect the sheet's embossing mode also is a significant parameter.

BRIEF DESCRIPTION OF THE INVENTION

The objective of the present invention is an embossing mode which improves the absorptivity of the tissue paper.

Another objective of the present invention is an embossing mode offering attractive appearance.

Such goals are attained in the invention using a sheet of tissue paper comprising at least one first embossed zone comprising protrusions on one side that correspond to alveoles on the other, these alveoles exhibiting a substantially polygonal base, and further a second, unembossed zone, the sheet being characterized in that

- the alveoles are configured in at least one array,
- the mutually facing sides of two adjacent alveoles subtend a bridge having rectilinear or substantially rectilinear edges of which the length L exceeds its largest width D,
- one or several bridges connected to each other subtending a path preferably between two second unembossed zones that are separated by at least one first embossed zone.

The expression "bridge" denotes that portion situated between two adjacent alveoles, In a preferred embodiment of the invention, the bridge edges are straight. However, the bridge edges may be curved without thereby transcending the present invention. Preferably the edges run parallel to each other, though they also may be slightly sloping with respect to each other as elucidated further below.

The bridge width D is defined by the distance between the edges of two adjacent alveoles. When the edges do not run parallel to each other, the mean distance along the bridge is considered.

In the latter case, the width can vary within a plane parallel to the sheet's surface. The bridge width also can vary in a plane perpendicular to the sheet surface between the surface at the top of the alveole and its base. The greatest width is determined both in the plane parallel to the surface and in the plane perpendicular to it.

The width can be minute when the bridges are not planar, for example being transversely convex as is the most common occurrence.

The structure of the invention is novel over that contained in the prior art. Surprisingly, it is observed that the bridges draw visual attention and create a pattern distinct from that subtended by the alveoles, whereas in the prior art patterns, the apparent pattern has been that of the alveoles themselves. The embossed pattern of the invention suggests a product with an embroidered textile pattern. By its straight edges, the bridge suggests the look of massed fibers or filaments of a woven or merely textile product.

In particular the sheet of the invention exhibits at least the distinct topographical tiers that contrast the pattern defined by the alveole arrays.

A first tier corresponds to the alveole bottoms, a second tier corresponds to the unembossed zone and the third tier corresponds to the bridge surfaces.

This design differs from that of the prior art wherein the alveoles/protrusions subtending arrays have exclusively a circular or oval base. While in the prior art the level of the sheet also is lower between two adjacent alveoles than that of the second zone, on the other hand this portion assumes the shape of a rounded hollow that cannot be likened to a bridge. The invention makes it possible to set up well-defined discontinuities between tiers which are sources of contrast. Contrast furthermore is reinforced by those straight or substantially straight edges.

Preferably the ratio L/D of the tissue-paper sheet is greater than 1, preferably greater than 1.5, and in particular greater than 3.

The sheet furthermore is characterized by the distance between two first adjacent zones $A_1$, $A_2$ which are separated by an unembossed zone B that is the same as or up to three-fold the width of the first zones $A_1$, $A_2$, preferably between the same as and double.

An embossed sheet of which the pattern comprises square alveoles already is known. Illustratively the U.S. Pat. No. 4,293,990 describes an embossed paper sheet for wiping purposes. The embossing consists of plane portions separated by troughs. The distance, in width and in length, between the alveoles in this reference, always is identical. The bridges no longer exist. Also, even though the trough flanks are straight, this pattern lacks any portion that would correspond to the second zones of the invention, in other words this document lacks three tier zones.

As regards a particular embodiment of the invention, the alveole cross-section can be triangular to attain the advantage that they may be configured in arrays constituting segments of curves without thereby foregoing the features offered by the bridges.

Advantageously the slope a of at least one of the alveoles relative to the vertical to the plane of the sheet is between 20° and 45°.

Moreover, the linear density of the alveoles is between 2 and 20 alveoles/cm; their density per unit area is between 4 and 50 alveoles/$cm^2$, preferably between 4 and 20 alveoles/$cm^2$.

The sheet/ply of the invention may be combined with a second sheet/ply to constitute together a double-thickness sheet.

In this manner the second sheet/ply may be a sheet of tissue paper that is dried by an air cross-flow.

In one significant feature of the invention, the arrays are concentric.

The sheet embossing cylinder is fitted with embossing tips having polygonal bases and constituting arrays wherein two adjacent embossing tips are situated in a way that two respective sides of the polygonal base of the two embossing tips mutually face each other and are significantly mutually parallel.

Preferably the bases of the embossing tips are triangular.

In particular the cylinder of the invention is characterized in that the angle β subtended between the two sides of the substantially parallel embossing tips is between 0° and 35°.

Preferably each of the embossing tip sides subtends an angle α of 20° to 45° with a plane perpendicular to a cylinder generatrix defined at the sides.

It is understood that the method for manufacturing a sheet so that it is pressed against an engraved cylinder is part of the present invention.

Another objective of the invention is the method for attaining the above defined product. Surprisingly it was found that a pattern comprising alveole arrays constituting such a triple tier topography can be produced by embossing tissue paper on an engraved cylinder comprising a single engraving depth. In this manner complex and costly engravings in the cylinders have been circumvented.

Other advantages and features of the invention are elucidated in the description below of a non-limiting, illustrative embodiment and in relation to the attached drawings.

DETAILED DESCRIPTION OF THE INVENTION

Figure 1:
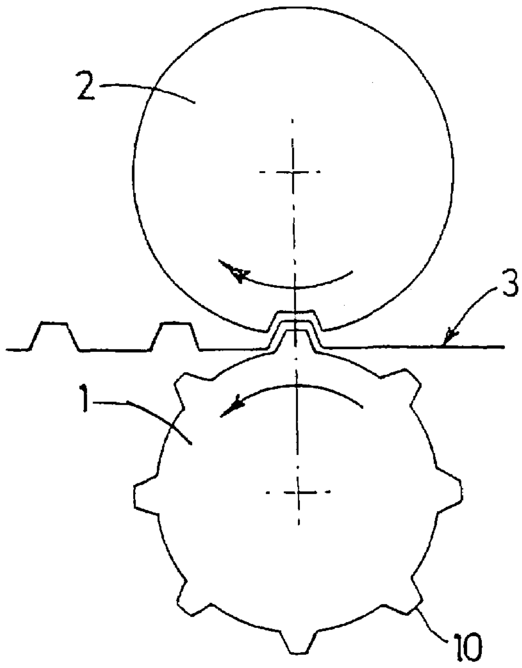
FIG. 1 schematically shows an embossing sub-assembly.

FIG. 1 schematically shows an industrial sub-assembly used to emboss tissue paper plies and to transform them into a household or sanitary sheet. This sub-assembly comprises a typically metallic embossing cylinder 1 fitted with a surface which is engraved to provide the desired embossing, and a cylinder 2 clad with rubber or any other deforming material. The two cylinders' axes run parallel to each other and the cylinders do roll on each other. The sheet 3 of tissue paper is guided between the two cylinders while the drive means are rotating these cylinders in mutually opposite directions and compression means compress them at a specified compression. By being deformed in the contact zone, the rubber follows the engraving's topography of the first cylinder 1. The sheet 3 inserted between the two cylinders undergoes the same deformation. The engraving topography consists of embossing tips 10 that are shown enlarged relative to the cylinder diameter and which are distributed according to the selected pattern. The width of the contact zone constitutes a rectangular band and is denoted by the expression “imprint zone” and is stated in cm.

Figure 2A:
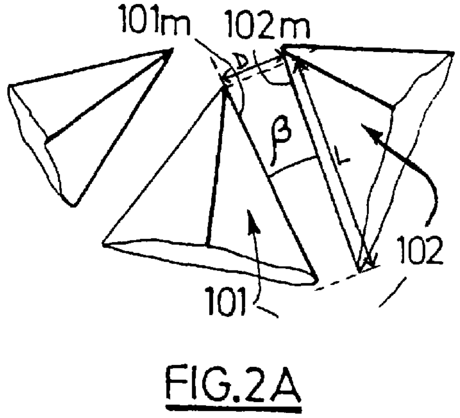
FIG. 2A is an enlargement of part of FIG. 2.
Figure 2:
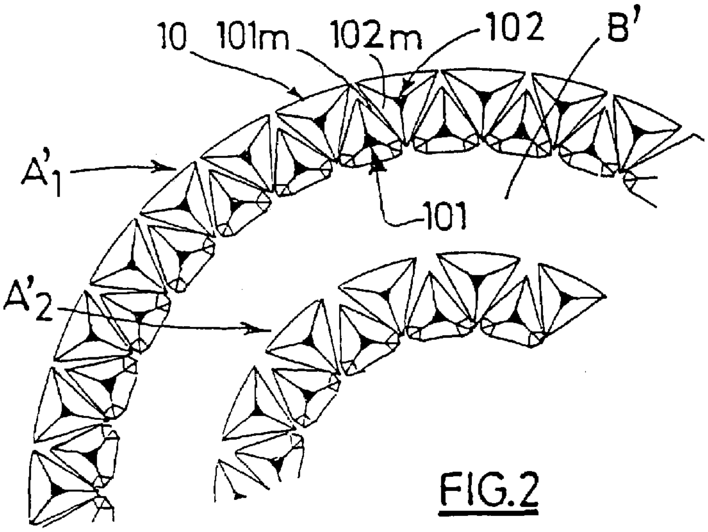
FIG. 2 shows part of an illustrative embossing pattern of the cylinder of the invention.

FIG. 2 is a top view of part of a pattern engraved into the cylinder 1 and belonging to one embodiment of the invention.

Preferably this pattern consists of embossing tips 10 having a triangular base. The embossing tips are configured in arrays $A'_1$, $A'_2$ which in this example are substantially arcs of circles and constitute first embossing zones $A_1$, $A_2$. A second zone B' free of any embossing tips 10 is configured between two arrays $A'_1$, $A'_2$.

Figure 3:
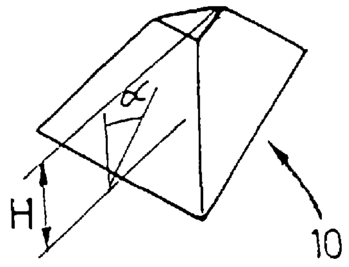
FIG. 3 is a perspective of an embossing tip for the pattern of FIG. 2.

Preferably the embossing tips assume a pyramidal shape having a triangular base as shown more clearly in FIG. 3. Their apex is not a point but truncated. It constitutes a flat. The height H of the embossing tips is measured from their apex to the engraving bottom and varies approximately from 0.1 to 2.5 mm. The height H depends on the particular application.

Preferably shallower heights are selected for products such as toilet paper or table napkins that offer a soft touch. On the other hand a greater height H should be used to better exploit the absorptivity of tissue paper.

The pyramidal sides of the adjacent embossing tips can slope identically or differently. The base is at least substantially polygonal and two adjacent embossing tips are configured in such a way that their bases constitute two straight parallel or substantially parallel sides as elucidated below.

The angle α of the embossing tip slopes shown in FIG. 3 preferably are between 20° and 45° as measured relative to the vertical to the embossing tip base, namely perpendicularly to the cylinder axis.

Even though the embossing tip 10 of FIG. 3 shows for example sharp edges, the scope of the invention furthermore comprises pyramidal embossing tips exhibiting rounded edges. Other embossing tips having polygonal bases can be in the form of trapezoids, diamonds, etc.

Depending on the shown embodiment mode, the embossing tips of a given array are configured in such a way that the apices 101, 102 of two arbitrary adjacent embossing tips can be slightly shifted from one another with respect the general direction of the array. FIG. 2 in particular illustrates this case for the array zones $A'_1$ or $A'_2$.

As regards the space subtended between two embossing tips, it is defined by the sides 101*m* and 102*m* of their triangular base. Preferably the two adjacent sides 101*m*, 102*m* of two embossing tips subtend between them an angle β which in one feature of the invention and as illustratively shown in FIG. 2A is between 0° and 35°.

In this embodiment, where the embossing tips exhibiting a triangular base are arrayed in arcs of circles, two adjacent embossing tips point in opposite directions. In other words, a first and a third embossing tip of such an array point toward the center of the circle defined by the array whereas the second embossing tip configured between the first and third embossing tips points out of the circle defined by the array and is situated between the first and second embossing tips.

Preferably the angle β subtended between the two sides shall be less than 35° to allow forming a bridge on the embossed product. The distance between two consecutive embossing tips is rather small. The distance is such that for the embossed product, the ratio of the length L of the bridge-constituting part to its width D is larger than 1, though a more pronounced result is attained at a larger ratio, for example of 1.5 or in particular 2 or 3.

The width D denotes the distance between two sides of two adjacent alveoles. This width can be measured at an arbitrary height between the alveole’s base and apex. Accordingly, the width D varies with the angle α.

The bridge length L corresponds substantially to the length of two adjacent sides 101*m*, 102*m* of two adjacent embossing tips 10.

The implementation of the patterns of the invention is especially significant when the embossing tips are arrayed in the nested mode and the first zones are apart from one another by second zones which are unembossed and substantially equal. In this configuration, the widths are preferably the same because then a very marked tier differential is observed between the first and second zones.

The invention furthermore includes the case of two arrays being adjacent, that is near each other in order to constitute an embossed zone which in turn is enclosed by unembossed zones. In this manner bridges are created between the alveoles of the different arrays and allow communication between an unembossed zone and another situated on the other side of the embossed zone.

Figure 7:
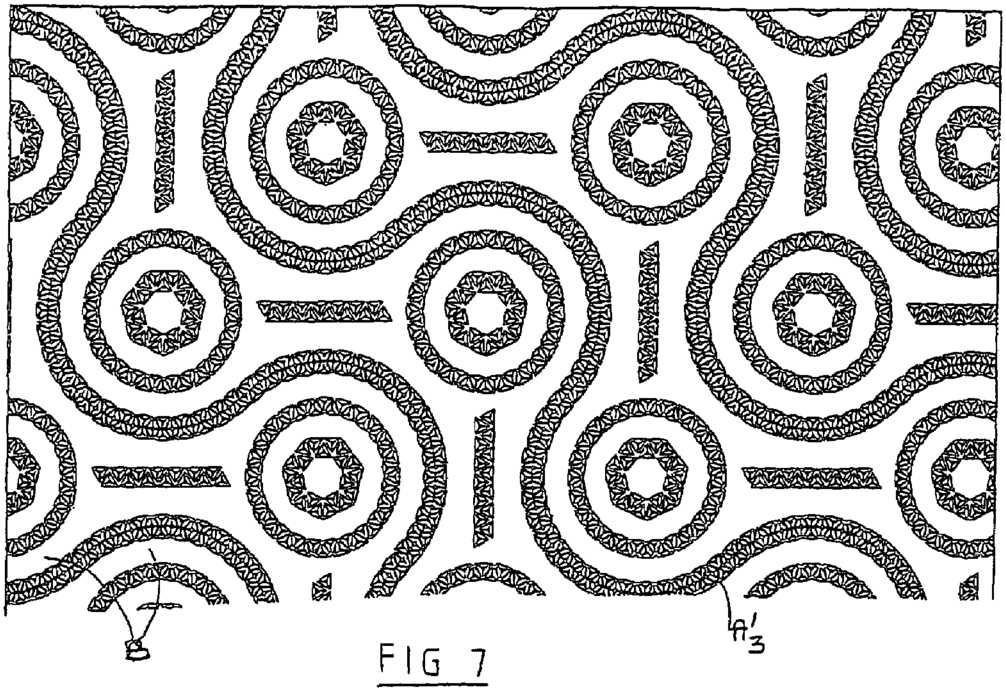
FIG. 7 shows a pattern made on a cylinder of still another embodiment of the invention.

FIG. 7 illustrates one implementing mode of this kind. It shows a portion of an engraved cylinder in particular exhibiting wavy embossing tip arrays $A'_3$. Using this kind of cylinder, sheets can be made comprising alveole arrays such that two bridges connected to each other subtend a path between two unembossed zones.

An array of alveoles is understood to be a set of at least two adjacent alveoles that bound at least one bridge.

These arrays can consist of sets of alveoles having polygonal bases, which are juxtaposed with other types of alveoles, illustratively, corresponding to conventional protrusions having a circular base. This variation is not shown herein.

Figure 4:
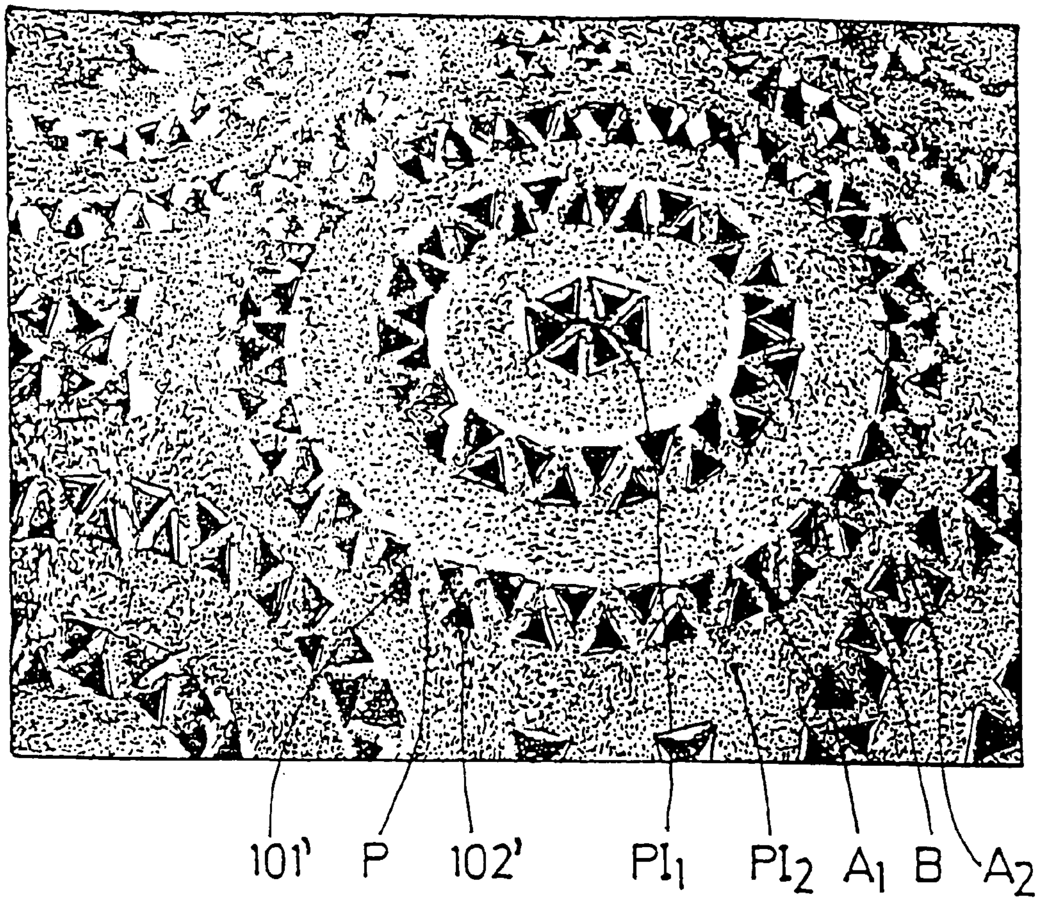
FIG. 4 is a partial perspective photograph of an embossed product of FIG. 2.

FIG. 4 is a partial perspective of a product embossed on a cylinder exhibiting the pattern of FIG. 2.

FIG. 4 shows the alveoles 101' and 102' being configured in arrays $A_1$, $A_2$ that in this example are circles. The alveoles are separated by parts constituting zig-zag bridges P according to the pattern of the shown embodiment. The bridges P are convex and lack a plane upper surface. This feature is due to the small distance between the protrusions along the arrays. The paper when being embossed does not touch the bottom of the engraving. The arrays of protrusions are separated by unembossed ones B. The bridges can be seen being slightly retracted relative to the zones B. This height disparity increases the contrast between the embossed zones $A_1$, $A_2$ and the unembossed zones B.

Figure 6:
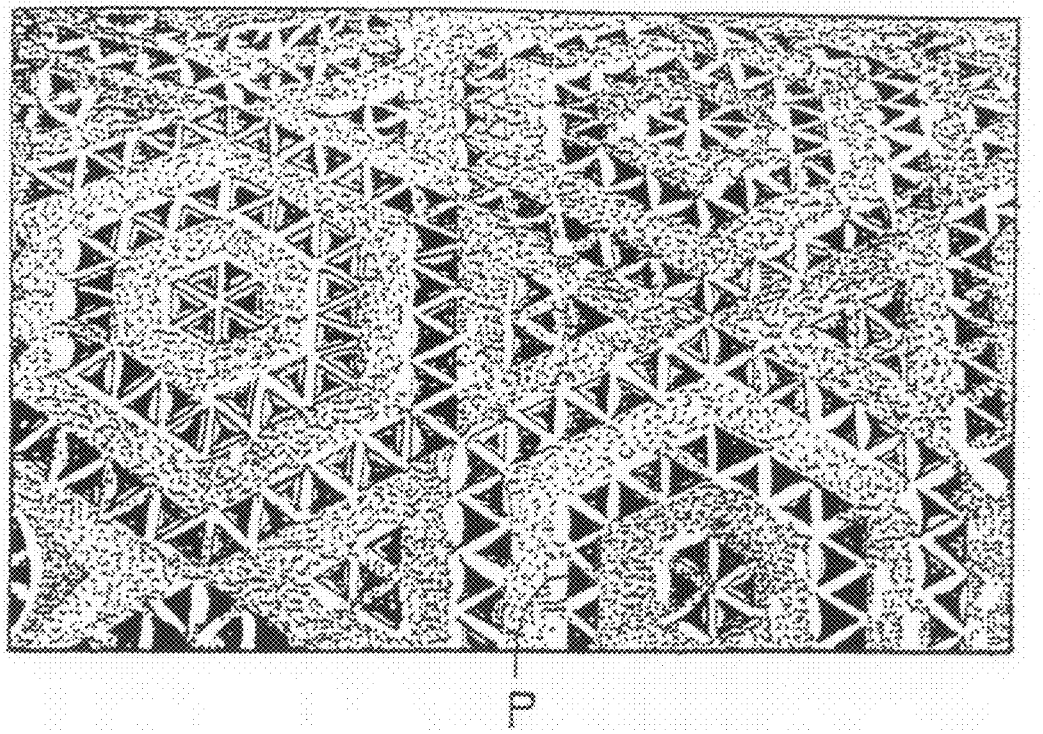
FIG. 6 is a perspective photograph of an embossed product of another embodiment of the invention.

Accordingly, and as shown in FIGS. 4 and 6, highly visible bridges are formed. Each bridge P exhibits a length L and a width D. Supplementary patterns so created impart a novel appearance to the product.

Figure 8:
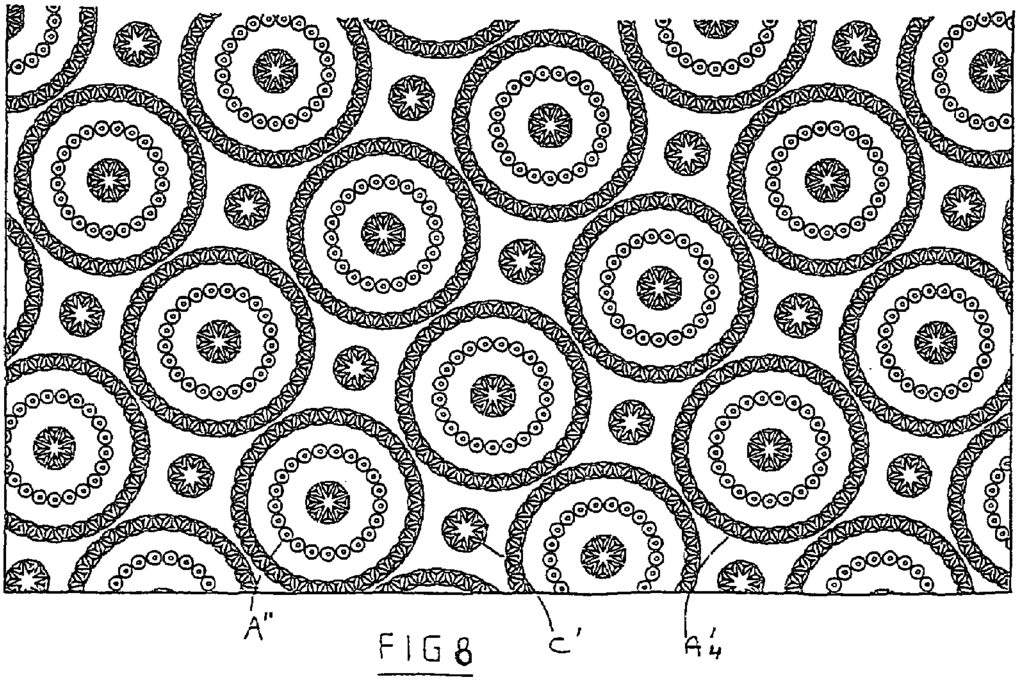
FIG. 8 shows another cylinder pattern of the invention.

Without thereby transcending the scope of the present invention, the pattern can be as schematically shown in FIG. 8, corresponding to the surface of a cylinder, that is not only regarding arrays $A'_4$ of polygonal-base embossing tips defining first circles, but also to other arrays A" consisting of cross-sectionally circular embossing tips defining circles that are concentric with the first circles. Moreover, other C' pattern elements constituted by an array of embossing tips having a polygonal (in this instance triangular) base can be considered. Considering the relative configurations of the embossing tips of the latter array, the adjacent sides of two embossing tips in this case subtend an angle β (as illustrated in FIG. 2A). As a result and as regards the embossed product, the bridge so formed fails to have a constant width. In this kind of pattern, the width of the unembossed zone can be identical with, or even less than the width of the alveole arrays.

A first sheet can be embossed in a pattern of arrays of polygonal alveoles. This first sheet can be associated with a second embossed sheet of the same type of pattern so that the two sheets will be assembled in a position known as “nested”

Figure 5:
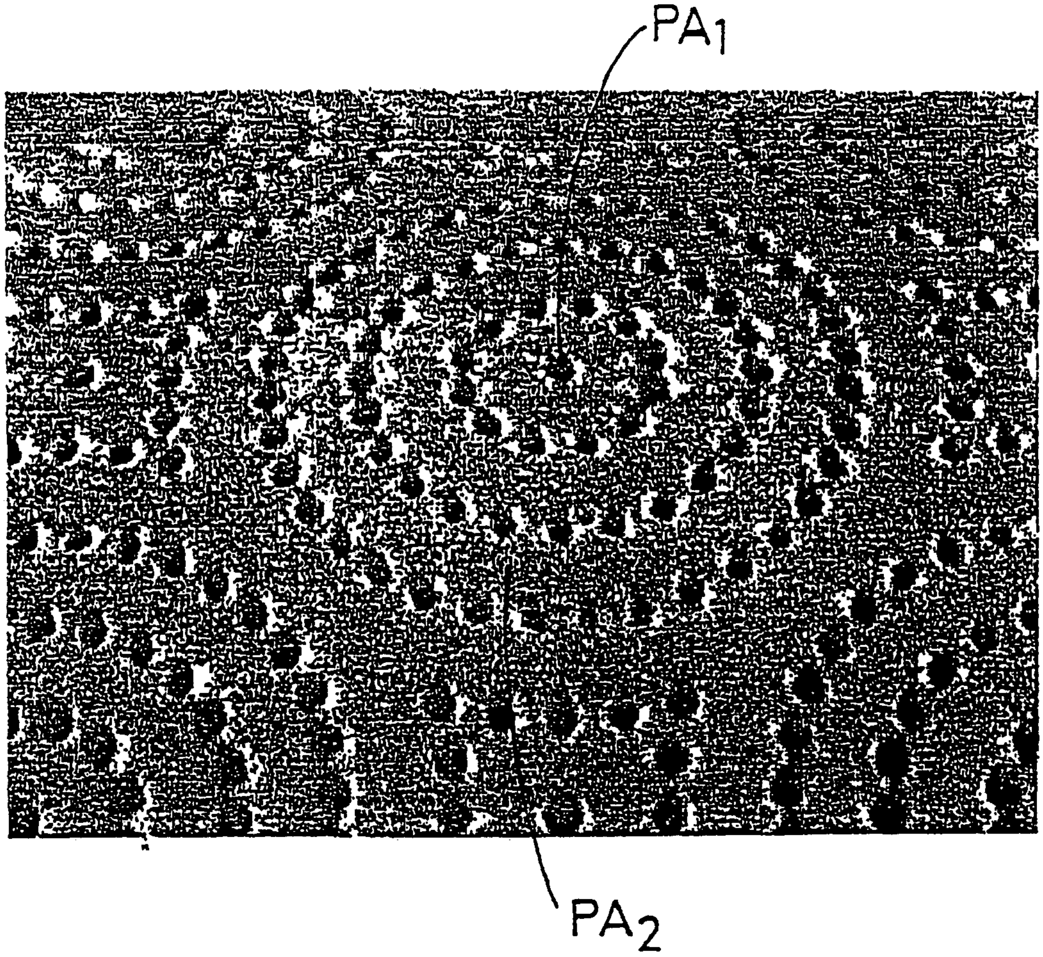
FIG. 5 is a perspective photograph of an embossed product of the prior art.

In other embodiment modes of the present invention, a first sheet can be embossed in the manner of the embodiment modes shown in FIG. 4 (sheet), 7 or 8 (cylinder). This first sheet can be combined with a second embossed sheet either using a pattern of the prior art, that is in the absence of bridges, for example as shown in FIG. 5, or using a pattern combining arrays comprising bridges with arrays lacking bridges as illustratively shown in FIG. 8.

Not only does this product offer visual contrast, but furthermore its absorptivity has been technically improved.

It was noted in surprising manner that the products of the present invention offer very clearly improved absorption.

This feature is very advantageous in particular when using the sheet of the invention for paper towels.

Thus various tests have shown not only an increase in absorption, improved liquid diffusion both in the transverse direction and in that of advance, and lastly the sheet of the invention offers higher rates of liquid absorption than do the products of the prior art.

Tests were run to prove that the products of the invention offer higher absorption than those of the prior art:

(1) Test Measuring Absorptivity and the Rate of Absorption Under Pressure.

In this test, the specimen is laid flat on a porous, sintered glass plate with pore sizes of 40 μm. A weight-loaded plate is placed on the specimen. In this manner this specimen is slightly compressed. The porous plate in turn rests on a second plate fitted at its center with an orifice to which is connected from below a flexible tube. This flexible tube sets up communication between the volume of the porous plate and a reservoir of liquid of which the level can be adjusted relative to that of the porous plate. The reservoir furthermore rests on a weighing scale. This design allows determining how much liquid has run into the specimen when the reservoir was raised relative to the porous plate.

In general the liquid is water containing 9 g/l of sodium chloride.

The procedure is to impregnate the specimen through the porous plate by lowering the specimen relative to the reservoir. The quantity of absorbed liquid is measured simply by determining the loss of water in the reservoir. Different weights are used as needed.

Measurements of absorption capacity also can be carried out in the absence of excess pressure.

The specimens were as follows:

Specimen L1, an embossed paper towel composed of two plies of a specific surface weight of 23 g/m$^2$, each ply nesting in the other, being marketed by applicant. This product is shown as a photograph in FIG. 5; the $PA_1$ alveoles are circular and are configured in concentric circles subtending between them unembossed zones $PA_2$;

Alveole diameter: 1 mm, measured at the bottom,

Alveole density=7 alveoles/cm$^2$,

Number of alveoles along an array: about 4 alveoles/cm.

Specimen M1, same basic paper as in L1, but embossed in the manner of the invention and also composed of two plies.

The alveoles comprise a base in the form of an equilateral triangle of which the sides are 1 mm long. The product is shown in the photograph of FIG. 4.

These alveoles are configured in circles in the manner of the pattern of FIG. 2. The pattern density is the same as for specimen L1. The values per unit area and per unit length along the arrays are the same.

Specimen N1, a two-ply sheet is manufactured from the same paper and with a specific pattern comprising the same alveoles as in the M1 case, however the arrays no longer are circular; the circles have been replaced by hexagons; the product is shown in FIG. 6 and its appearance is different The Table below lists the absorptivities consecutively measured as the pressures increased from 5 to 55 and to 105 g/cm$^2$ and then returned to 5 g/cm$^2$. The value of 5 g/cm$^2$ is thought to represent the pressure undergone by a paper towel in ordinary use.

The properties of the basic, pre-embossed paper tissue, paper 1 and of those of the cellulose paper webs L1, M1, N1 are shown in the Table below.

| | Specific surface weight | Thickness, | Dry tensile strength N/m/2-ply | | Wet tensile strength N/m/2-ply | | Absorption (g/g) at different pressures (g/cm$^2$) | | | |
|---|---|---|---|---|---|---|---|---|---|---|
| | in g/m$^2$ | mm | MD | CD | MD | CD | 5 | 55 | 105 | 5 |
| paper 1 | 46 | 0.18 | 1151 | 627 | 307 | 174 | 3.8 | 3.2 | 2.9 | 3.4 |
| L1 | | | | | | | 6.2 | 3.2 | 2.7 | 3.8 |
| M1 | | | | | | | 6.7 | 3.4 | 2.8 | 4.0 |
| N1 | | | | | | | 6.6 | 3.4 | 2.8 | 4.0 |

The specific surface weight is expressed in g/m$^2$. The thickness is measured by means of a stack of 12 sheets and then is interpolated to one. Tear resistance is measured on specimens cut out of a two-ply sheet and 5 cm wide and is listed in N/m. Absorption is measured as g of liquid absorbed by g of paper (g/g).

As regards Specimens M1 and N1 of the invention, there is improvement in absorption relative to a pattern of alveoles having circular bases (specimen L1). Improvement is more pronounced at small loads, that is at 5 g/cm$^2$. This feature is interpreted by the pattern effect decreasing with an increase of compression applied to the paper towel sheet. This difference is also observed between the embossed and unembossed sheets which are otherwise identical.

(2) A second test, the so-called the "diffusion test", was run to ascertain a specimen's wetting ability by liquid diffusion. In general the liquid is water with a salt content of 0.9%. The specimens are rectangular, for instance 12×2.5 cm and are placed on a plate which can be inclined, electrodes that are spaced 1 cm apart furthermore being placed on each sample, one end of each of these samples being immersed in water. The set of these electrodes is connected to a computer which in particular records the timing of each wetted cm. A program processes these data and the results are listed in the table below, wherein the first line of numbers 1 through 9 corresponds to the number of wet cm. In this table, L relates to a known product; M and N respectively relate to the M1 and N1 products of the absorption test.

| | Time of diffusion in the direction of advance (s) | | | | | | | | Time of diffusion in the transverse direction (s) | | | | | | | |
|---|---|---|---|---|---|---|---|---|---|---|---|---|---|---|---|---|
| | 1 | 2 | 3 | 4 | 5 | 6 | 8 | 9 | 1 | 2 | 3 | 4 | 5 | 6 | 8 | 9 |
| L | 0.8 | 3.3 | 7.7 | 16 | 25 | 36 | 64 | 86 | 0.7 | 2.5 | 5 | 7.7 | 12 | 16 | 28 | 36 |
| M | 1.1 | 3.9 | 6.9 | 15 | 22 | 28 | 52 | 66 | 1 | 2.9 | 5.5 | 10 | 14 | 19 | 34 | 43 |
| N | 1.2 | 3.7 | 8.8 | 13 | 21 | 29 | 56 | 68 | 0.9 | 2.6 | 4.6 | 8 | 14 | 20 | 33 | 42 |

As regards the M and N products the M and N products fitted with the pattern of the invention, the diffusion times in the direction of advance and in the transverse direction are closer to each other than for the product L. This means that the liquid diffuses more efficiently in all directions than in the L product fitted with a prior art embossing.

(3) An absorption rate test was carried out to determine to what extent the alveole geometry and the array of the alveoles allow creating bridges participating in absorption.

A horizontal cylinder is configured above a teflon-coated blade. A sheet of paper is affixed to the cylinder, facing the blade. A stained drop of water is deposited on the blade which is slowly made to approach the sheet on the cylinder. A strong light is incident on the drop and a picture is taken by a camera which is triggered just before absorption. The maximum time of recording is 5.4 seconds at the rate one picture every 4 ms.

The pictures so taken measure the change with time of the drop diameter.

The time taken by a drop on the blade to penetrate the paper substrate is measured and this measurement is repeated as often as required to collect a statistically significant sampling. These measurements were carried out on specimens of the same paper as in the above embodiment and at two different spots. First the absorption time by the paper was measured at points $PI_1$ (FIG. 4) and $PA_1$ (FIG. 5) in the central pattern zone, then at points $PI_2$ (FIG. 4) and $PA_2$ (FIG. 5), that is, in an unembossed zone (which does however relate to an embossed zone of the second ply).

Figure 9:
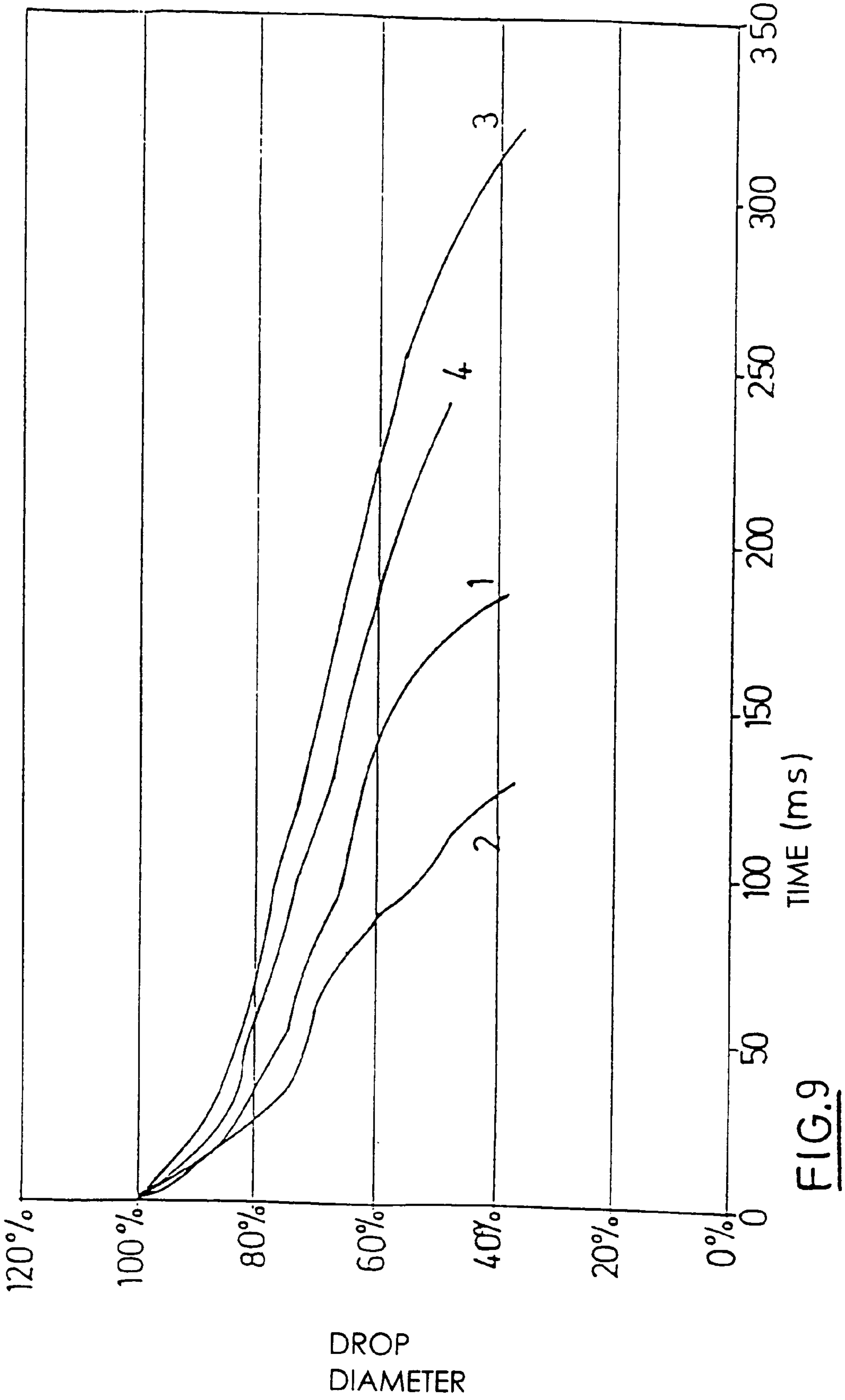
FIG. 9 is a plot of the absorption rates measured on a product of the invention and on a product of the prior art.

In this manner the mean time of drop absorption was measured. FIG. 9 is a plot of the absorption curves relating to the drop diameter as a function of time.

These four curves each show the change in the drop diameter as a function of time, the drop being applied at different spots of two kinds of sheets.

Curve 1 shows a drop applied at point $PA_1$ of FIG. 5,

Curve 2 shows the plot of a drop applied at point $PI_1$ of FIG. 4,

Curve 3 is the plot of a drop applied at point $PA_2$, and

Curve 4 is a plot of a drop applied at point $PI_2$.

It is clear from FIG. 9 that, the application points being the same, the drop diameter decreases more rapidly when this application is to a product of the invention. One can properly infer that the absorption rate of the liquids applied to the surface is higher.

Be it noted furthermore that the improvement in the absorption rate is attained at the ply surface both in an embossed and in an unembossed zone. In fact it is necessary take into account the ply underneath which is respectively embossed and unembossed. Therefore the invention pervasively affects the double (two-ply) sheet.

The invention claimed is:

1. A sheet of tissue paper comprising at least one first embossed zone including protrusions on one side corresponding to alveoles on an opposite side, the alveoles in said at least one first embossed zone having a truncated pyramidal shape with pyramidal sides and having a substantially polygonal base; and at least one unembossed zone; wherein said alveoles are configured as at least one array and adjacent alveoles in said array have mutually facing pyramidal sides, and said mutually facing pyramidal sides of two adjacent alveoles subtend a bridge having rectilinear or substantially rectilinear edges of length L greater than a maximum width D of the bridge, wherein said bridge subtends a path between two unembossed zones and at least two bridges connected to each other subtend a path between two unembossed zones that are separated by said array of said alveoles.

2. Sheet of tissue paper as claimed in claim 1, wherein said bridge is connected to another bridge and subtends a path between two of said at least one unembossed zone which are separated by said at least one first embossed zone.

3. Sheet of tissue paper as claimed in claim 1, wherein distance between two adjacent arrays in said at least one first embossed zone that are separated by one of said unembossed zone, is between greater than one to three times a width of said first embossed zone.

4. Sheet of tissue paper as claimed in claim 1, where the polygonal base of said alveoles is triangular.

5. Sheet of tissue paper as claimed in claim 1, wherein at least one wall of the alveoles slopes relative to vertical to a plane of the sheet and is between 20° and 45°.

6. Sheet of tissue paper as claimed in claim 1, wherein the alveoles have an area density of between 4 and 50 alveoles/$cm^2$.

7. Sheet of tissue paper as claimed in claim 1, wherein alveoles present in a linear array have a linear density of between 2 and 20 alveoles/cm.

8. Sheet of tissue paper as claimed in claim 1, further comprising a second sheet of tissue paper joined to said sheet to provide a two ply sheet.

9. Sheet of tissue paper as claimed in claim 8, wherein the second sheet is dried by air crossflow.

10. Sheet of tissue paper as claimed in claim 1, wherein said arrays are concentric.

* * * * *